US012450938B2

(12) United States Patent
Kawato et al.

(10) Patent No.: US 12,450,938 B2
(45) Date of Patent: Oct. 21, 2025

(54) DOCUMENT PROCESSING METHOD, AND INFORMATION PROCESSING DEVICE

(71) Applicant: LEGALON TECHNOLOGIES, INC., Tokyo (JP)

(72) Inventors: Takashi Kawato, Tokyo (JP); Ruka Funaki, Tokyo (JP)

(73) Assignee: LegalOn Technologies, Inc., Tokyo (JP)

( * ) Notice: Subject to any disclaimer, the term of this patent is extended or adjusted under 35 U.S.C. 154(b) by 328 days.

(21) Appl. No.: 18/104,867

(22) Filed: Feb. 2, 2023

(65) Prior Publication Data

US 2023/0177859 A1 Jun. 8, 2023

Related U.S. Application Data

(63) Continuation of application No. PCT/JP2020/029747, filed on Aug. 4, 2020.

(51) Int. Cl.
*G06V 30/416* (2022.01)
*G06V 30/10* (2022.01)

(52) U.S. Cl.
CPC ............ *G06V 30/416* (2022.01); *G06V 30/10* (2022.01)

(58) Field of Classification Search
CPC .... G06V 30/10; G06V 30/148; G06V 30/412; G06V 30/416; G06V 30/1444; G06V 30/1448; G06V 10/761; G06F 16/5846; G06F 40/166; G06F 40/205
See application file for complete search history.

(56) References Cited

U.S. PATENT DOCUMENTS

| 7,668,814 | B2 * | 2/2010 | Il | G06F 16/338 |
| | | | | 707/766 |
| 2010/0235353 | A1 * | 9/2010 | Warnock | G06F 16/338 |
| | | | | 707/723 |
| 2016/0103823 | A1 * | 4/2016 | Jackson, Jr. | G06N 5/025 |
| | | | | 704/9 |
| 2019/0197639 | A1 | 6/2019 | Sugaya | |
| 2020/0026916 | A1 * | 1/2020 | Wood | G06F 18/2178 |
| 2021/0303790 | A1 * | 9/2021 | Kubo | G06F 40/205 |
| 2021/0303843 | A1 * | 9/2021 | Kubo | G06V 30/414 |

FOREIGN PATENT DOCUMENTS

| JP | 2006-236262 A | 9/2006 |
| JP | 2019-045953 A | 3/2019 |
| WO | WO 2018/042548 | 3/2018 |

OTHER PUBLICATIONS

International Search Report directed to related International Patent Application No. PCT/JP2020/029747, mailed Oct. 6, 2020, with attached English-language translation; 4 pages.

* cited by examiner

*Primary Examiner* — Daniel G Mariam
(74) *Attorney, Agent, or Firm* — Sterne, Kessler, Goldstein &Fox P.L.L.C.

(57) ABSTRACT

A document processing method comprising: obtaining a character string indicating a content of a document extracting from document information; and obtaining a normalized extracted information by normalizing the character string information in the document information.

18 Claims, 11 Drawing Sheets

FIG.3

| Master Agreement for Staffing Services | $112a_1$ Title |
|---|---|
| This Master Agreement (hereinafter, the "Agreement") is entered into between Legal Force, Inc. (hereinafter, the "Client") and Legal Law, Inc. (hereinafter, the "Staffing Agency") as follows regarding the dispatch of a worker from the Staffing Agency to the Client. | $112a_2$ Preface |
| Article 1 (Objective)<br>The Agreement has the objective of dispatching a worker (hereinafter, the "Temporary Worker") employed by the Staffing Agency to the Client and making the Temporary Worker be engaged in work at the Client according to instructions of the Client based on the law for securing the proper operation of worker dispatching undertakings and protecting dispatched workers (hereinafter, the "Worker Dispatching Law"). | $112a_3$ Article |
| Article 2 (Applicable Range)<br>1. The Agreement shall apply to an individual worker dispatch agreement (hereinafter, the "Individual Agreement") concluded between the Client and the Staffing Agency.<br>2. [The Agreement shall also apply to an employment placement dispatch from the Staffing Agency to the Client (which means a worker dispatch where the Staffing Agency conducts or is planned to conduct an employment placement for the Temporary Worker and the Client before or after starting a worker dispatch.)] | $112a_{41}$ Paragraph $112a_{42}$ $112a_4$ Article |
| Article 3 (Individual Agreement)<br>1. When the Staffing Agency dispatches a worker to the Client, the Client and the Staffing Agency shall conclude the Individual Agreement regarding the necessary points based on Article 26: Other Related Laws and Regulations of the Worker Dispatching Law.<br>2. The Staffing Agency shall issue a notice including the name and sex of the Temporary Worker and other matters stipulated in the Worker Dispatching Law, its implementing regulations, and other related laws and regulations in a predetermined way, such as by issuing a written notice, immediately after the conclusion of the Individual Agreement. | $112a_5$ |
| Article 4 (Notice of Dispatchable Period and Conflict Date)<br>1. The Client and the Staffing Agency must not accept or dispatch the Temporary Worker over the dispatchable period provided in Article 40-2 of the Worker Dispatching Law (i.e., three years, or a period including an extended period if the extended period has been approved through opinion hearing proceedings) with regard to work at each dispatch worksite. Even when the dispatchable period has been extended, the Client and the Staffing Agency must not continuously accept or dispatch the same Temporary Worker for a period exceeding three years with regard to work in each organizational unit at the worksite.<br>2. In concluding the Individual Agreement with the Staffing Agency, the Client shall notify the Staffing Agency in advance of the first date that conflicts with the restriction on the dispatchable period (hereinafter, the "Conflict Date").<br>3. Even when the Client has extended the dispatchable period through opinion hearing proceedings after the conclusion of the Individual Agreement, the Client shall notify the Staffing Agency of the Conflict Date in a similar way each time the dispatchable period is extended. | $112a_6$ |
| Article 5 (Restriction on Act Intended to Identify Temporary Worker)<br>In concluding the Individual Agreement [excluding employment placement dispatch], the Client must endeavor not to commit any act intended to identify the Temporary Worker. | $112a_7$ |

| EXTRACTION ID | EXTRACTED INFORMATION | EXTRACTED ITEM | REFERENCED POSITION |
|---|---|---|---|
| 001 | Master Agreement for Staffing Services | Type of Agreement | Title |
| 002 | Conclusion Date of the Agreement | Effective Date of the Agreement | Article(2); 1-7w |
| 003 | Reiwa 1, February 1 | Conclusion Date | Article(n); 1-8w |
| 004 | Legal Force, Inc. | Name of Party Concerned 1 | Preface; 1-12w |
| ⋮ | ⋮ | ⋮ | ⋮ |

FIG.5

| EXTRACTION ID | EXTRACTED INFORMATION | NORMALIZED EXTRACTED INFORMATION |
|---|---|---|
| 001 | Master Agreement for Staffing Services | Worker Dispatch Master Agreement |
| 002 | Conclusion Date of the Agreement | February 1, 2019 (See ID:003.) |
| 003 | Reiwa 1, February 1 | February 1, 2019 |
| 004 | Legal Force, Inc. | Legal Force, Inc. |
| ⋮ | ⋮ | ⋮ |

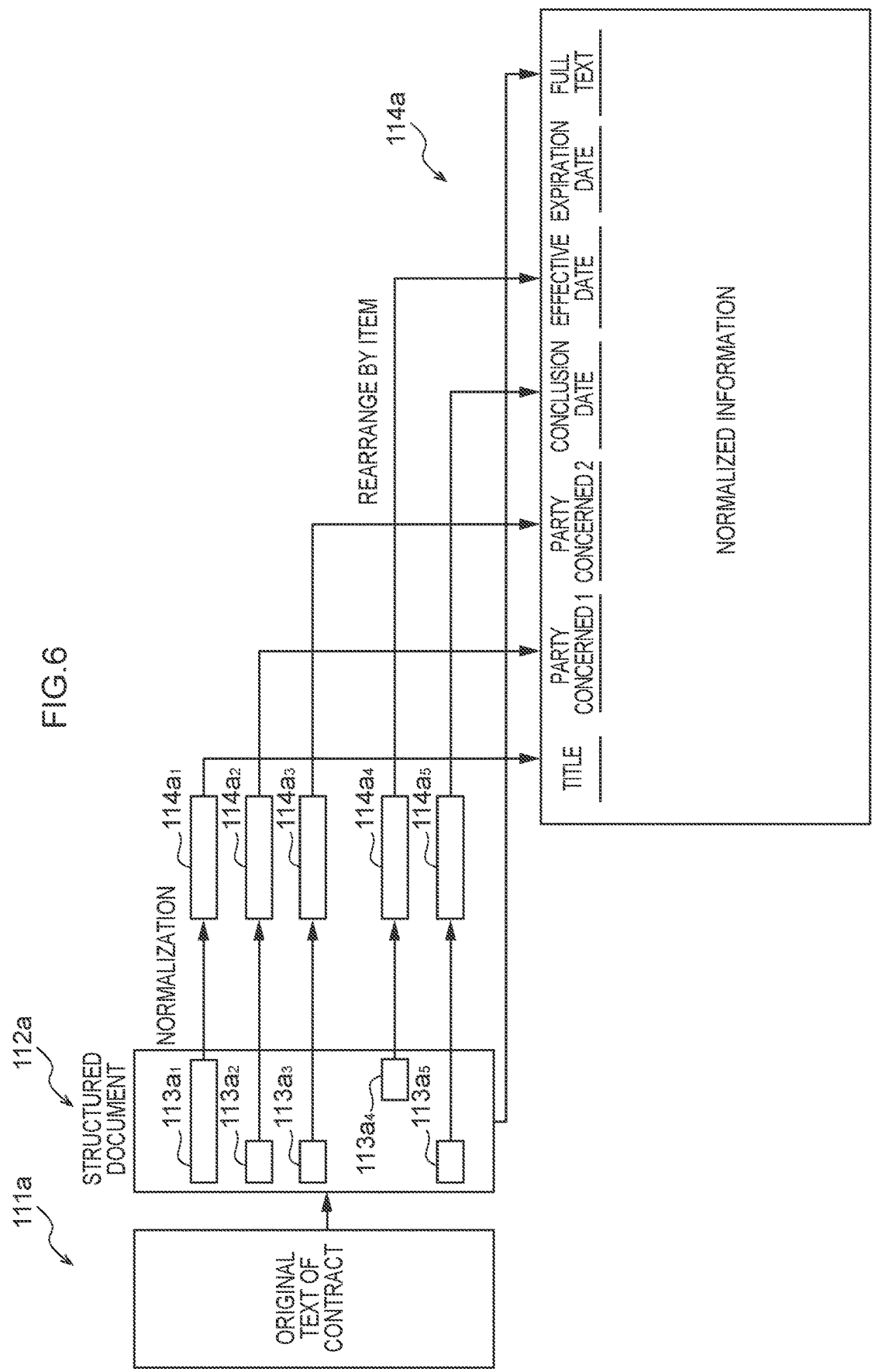

FIG.7

| EXTRACTED INFORMATION | EXTRACTED ITEM | NORMALIZED EXTRACTED INFORMATION |
|---|---|---|
| Heisei 29, July 1 | Conclusion Date of the Agreement | July 1, 2017 |
| One year from Heisei 29, July 1 | Expiration Date of the Agreement | June 30, 2018 |
| The validity period of the Agreement is as stipulated in "1. Agreement Period" of Paragraph 1 of the Harami Introduction Outline, and the Agreement will be automatically renewed under the same condition unless one of the two parties issues a written notice to the effect that the Agreement will not be renewed within three 3 months of the expiration date of the Agreement. The same shall apply hereinafter. | Automatically Renewed or Not | Automatically Renewed |
| the Company (Lessee): Legal Force, Inc. | Party Concerned | Legal Force, Inc. |
| the party described at the end of the Agreement [snip] Legal Force, Inc. | Party Concerned | Legal Force, Inc. |
| This Advisory Agreement (hereinafter, the "Agreement") is entered into between Legal Force, Inc. (hereinafter, the "Company") and the lawyer Nozomu SUMIDA (hereinafter, the "Lawyer") as follows. | Party Concerned | Legal Force, Inc./ Nozomu SUMIDA |
| The validity period of the Agreement is one year from the conclusion date of the Agreement. ... Conclusion date: January 1, 2020 | Effective Date of the Agreement | January 1, 2020 |
| ⋮ | ⋮ | ⋮ |

FIG. 8

| | Title | Master Agreement for Staffing Services |
|---|---|---|
| | Preface | This Master Agreement (hereinafter, the "Agreement") is entered into between Legal Force, Inc. (hereinafter, the "Client") and Legal Law, Inc. (hereinafter, the "Staffing Agency") as follows regarding the dispatch of a worker from the Staffing Agency to the Client. |
| | Article 1 | The Agreement has the objective of dispatching a worker (hereinafter, the "Temporary Worker") employed by the Staffing Agency to the Client and making the Temporary Worker be engaged in work at the Client according to instructions of the Client based on the law for securing the proper operation of worker dispatching undertakings and protecting dispatched workers (hereinafter, the "Worker Dispatching Law"). |
| | Article 2 | 1. The Agreement shall apply to an individual worker dispatch agreement (hereinafter, the "Individual Agreement") concluded between the Client and the Staffing Agency.<br>2. The Agreement shall also apply to an employment placement dispatch from the Staffing Agency to the Client (which means a worker dispatch where the Staffing Agency conducts or is planned to conduct an employment placement for the Temporary Worker and the Client before or after starting a worker dispatch.)] |
| | Article 3 | 1. When the Staffing Agency dispatches a worker to the Client, the Client and the Staffing Agency shall conclude the Individual Agreement regarding the necessary points based on Article 26: Other Related Laws and Regulations of the Worker Dispatching Law.<br>2. The Staffing Agency shall issue a notice including the name and sex of the Temporary Worker and other matters stipulated in the Worker Dispatching Law, its implementing regulations, and other related laws and regulations in a predetermined way, such as by issuing a written notice, immediately after the conclusion of the Individual Agreement. |
| | Article 4 | 1. The Client and the Staffing Agency must not accept or dispatch the Temporary Worker over the dispatchable period as provided in Article 40-2 of the Worker Dispatching Law (i.e., three years, or a period including an extended period if the extended period has been approved through opinion hearing proceedings) with regard to work at each dispatch worksite. Even when the dispatchable period has been extended, the Client and the Staffing Agency must not continuously accept or dispatch the same Temporary Worker for a period exceeding three years with regard to work in each organizational unit at the worksite.<br>2. In concluding the Individual Agreement with the Staffing Agency, the Client shall notify the Staffing Agency in advance of the first date that conflicts with the restriction on the dispatchable period (hereinafter, the "Conflict Date").<br>3. Even when the Client has extended the dispatchable period through opinion hearing proceedings after the conclusion of the Individual Agreement, the Client shall notify the Staffing Agency of the Conflict Date in a similar way each time the dispatchable period is extended. |
| | Article 5 | ... |

| Title | Worker Dispatch Master Agreement |
|---|---|
| Party Concerned 1 | Legal Force, Inc. |
| Party Concerned 2 | Legal Law, Inc. |
| Conclusion Date | February 1, 2019 |
| Effective Date | February 1, 2019 |
| Expiration Date | ... |

DOCUMENT PROCESSING METHOD, AND INFORMATION PROCESSING DEVICE

CROSS-REFERENCE TO RELATED APPLICATION

The present application is a bypass continuation application based on and claims the benefit of priority from PCT Application No. PCT/JP2020/029747 filed Aug. 4, 2020, the entire contents of which are incorporated herein by reference.

FIELD

The present disclosure relates to a document processing program, an information processing device, and a document processing method.

BACKGROUND

As a conventional technique, an information processing device have been disclosed in International Publication No. WO 2018/042548. The information processing device disclosed in the international publication detects a predetermined keyword from text of a contract, and recognizes the important part for a user who makes a contract based on the detected keyword.

SUMMARY

An aspect of the invention according to the present disclosure provides a document processing method, and an information processing device described below. An aspect of the invention according to the present disclosure is a document processing method comprising: extracting from document information a character string indicating a content of a document together with positional information of the character string in the document information; normalizing the character string extracted by the extraction means to obtain normalized extracted information; and displaying a content of the normalized extracted information while indicating a position of the normalized extracted information in the document information based on the positional information.

BRIEF DESCRIPTION OF DRAWINGS

FIG. 3 is a schematic view illustrating an exemplary structure of document information.

FIG. 4 is a schematic view illustrating an exemplary structure of extracted information.

FIG. 5 is a schematic view illustrating an exemplary structure of normalized extracted information.

FIG. 6 is a schematic view for illustrating an exemplary process of an operation of extracting information.

FIG. 7 is a schematic view for illustrating an exemplary operation of a normalization means.

FIG. 8 is a schematic view illustrating an exemplary display of a display control means.

DESCRIPTION

In the foregoing conventional technique, the information processing device may not handle the detected keyword if it has spelling inconsistencies, which may be problematic. Further, when the contractor wants to know the details of the contract corresponding to the detected keyword, it would be impossible to, if the detected keyword has spelling inconsistencies, manage all of the relevant portions in a unified manner, which may be problematic.

In view of the foregoing conventional technique, an object of the present disclosure is to provide a document processing program, an information processing device, and a document processing method that are easier to use.

(Configuration of Document Processing System)

Figure 1:
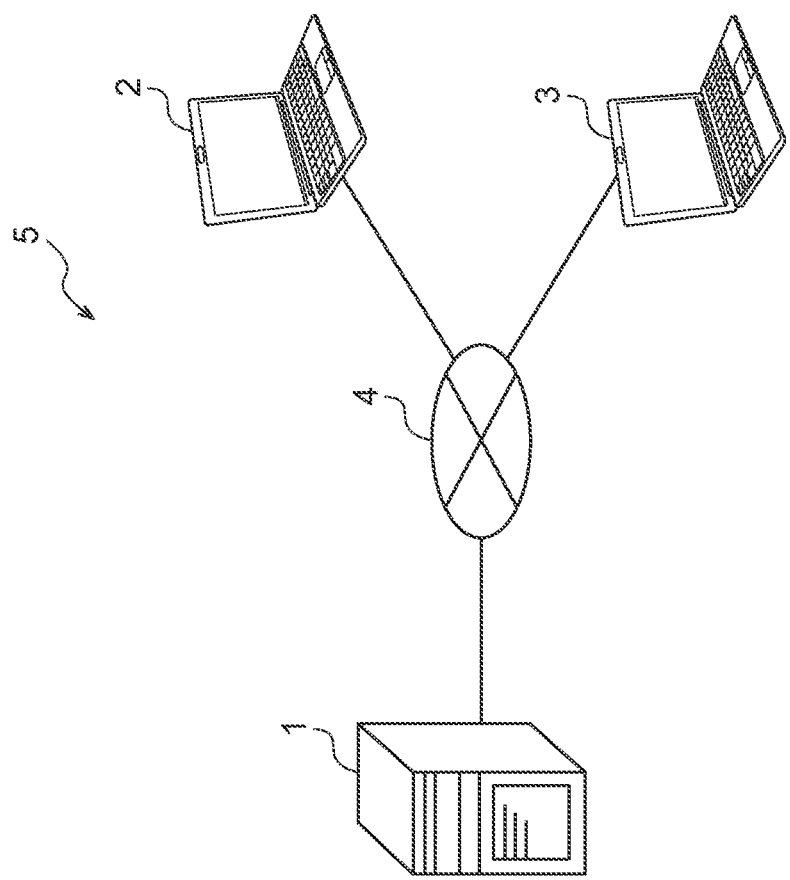
FIG. 1 is a schematic view illustrating an exemplary configuration of a document processing system according to an embodiment.

FIG. 1 is a schematic view illustrating an exemplary configuration of a document processing system according to an embodiment.

A document processing system 5 may include a document processing server device 1, a terminal 2, and a terminal 3 that are connected via a network 4 in a communicable manner. The terminal 2 may be operated by a user who wants to manage, create, check, and/or review a document, for example, and the terminal 3 may be operated by another user. Each of the user of the terminal 2 and the user of the terminal 3 handles a contract as document information, for example. The document processing system 5 may be mainly used to manage document information created by one or both of the users, and also manage the document information after conclusion, and check and grasp the content of such document information.

The document processing server device 1 may be a server-type information processing device that operates in response to requests from the terminal 2 and the terminal 3, and may include electronic components, such as a CPU (Central Processing Unit) with a function of processing information, an HDD (Hard Disk Drive), and a flash memory, within the body of the document processing server device 1. The document processing server device 1 may be a plurality of information processing devices that operate in a cooperative manner, or may be an information processing device operated through a given cloud service. Alternatively, the function of the document processing server device 1 may be implemented within the terminal 2 and/or the terminal 3.

Each of the terminal 2 and the terminal 3 may be an information processing device, such as a PC (Personal Computer) or a tablet terminal, and include electronic components, such as a CPU with a function of processing information and a flash memory, within the body of the terminal.

The network 4 may be a communication network that allows for high-speed communication, and is a wired communication network, such as the Internet, intranet, or LAN (Local Area Network); or a wireless communication network, for example.

In such a configuration, for example, a document to be processed by the document processing server device 1 is a document in the legal field, such as a contract, and one or both of the users is a person who is not a legal expert but needs to create a contract, or a person who is a legal expert, such as a lawyer, and has the knowledge of creating contracts. Alternatively, one or both of the users is a staff member of a sales department in a company or a staff member of a legal department in a company, for example.

A example of a basic operation of document processing system 5 is as follows. First, the terminal 2 or the terminal 3 may upload document information to the document processing server device 1 so that the document information is managed in the document processing server device 1. Then, the terminal 2 or the terminal 3 may access the document processing server device 1 to check the content of the document information, for example. In such a case, to reduce the burden of the checking operation of the user or assist the user in creating a contract, the document processing server device 1 may extract specific information from the document information, and may display the extracted information in a form that helps the user grasp the content of the information. Specific examples of the display method will be described later.

In the present embodiment, the document processing server device 1 mainly extracts information indicating the conditions of a contract from the document information, and presents the extracted information to one or both of the users. In the following, provisions of a contract may be referred to as "articles." Embodiments will be described hereinafter.

Although one terminal 2 and one terminal 3 are illustrated in the drawing, more than one terminal 2 and more than one terminal 3 may be connected to the network 4. Similarly, more than one user may operate each of such terminals.

(Configuration of Document Processing Server Device)

Figure 2:
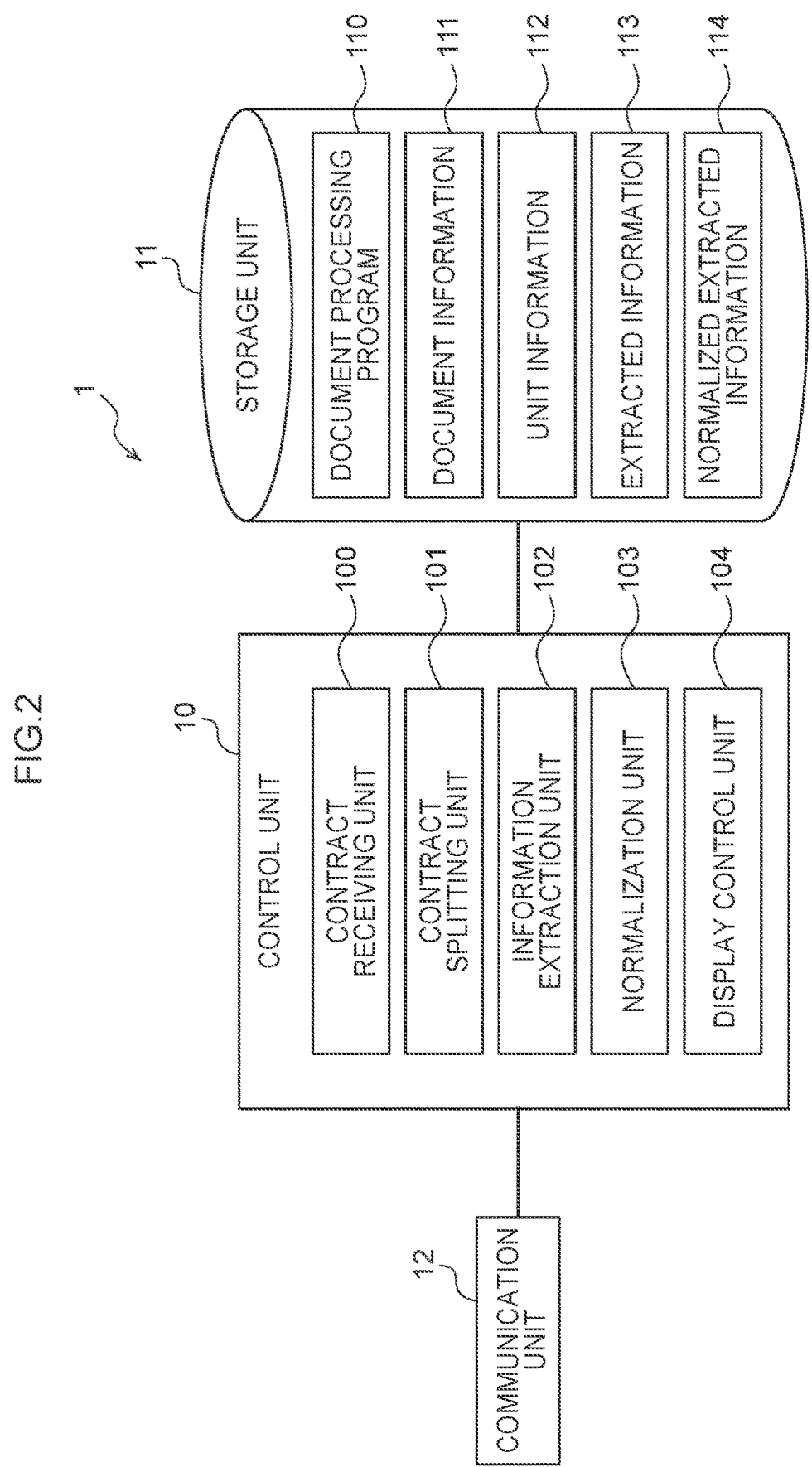
FIG. 2 is a block diagram illustrating an exemplary configuration of a document processing server device according to an embodiment.

FIG. 2 is a block diagram illustrating an exemplary configuration of the document processing server device 1 according to an embodiment.

The document processing server device 1 may include a control unit 10, which includes a CPU and the like, and controls each unit and also executes various programs; a storage unit 11, which includes a storage medium, such as a flash memory, and stores information; and a communication unit 12 functioning as a communication interface for communicating with the outside via the network 4.

The control unit 10 may include a processor, such as a CPU, and may be electrically connected to the storage unit 11 including the memory and to the communication unit 12 functioning as the communication interface. The control unit 10 may function as a contract receiving unit 100, a contract parsing unit 101, an information extraction unit 102, a normalization unit 103, a display control unit 104, and the like by executing a document processing program 110 described below.

The contract receiving unit 100 may receive a contract as document information 111 from the terminal 2 or the terminal 3, and may store the contract in the storage unit 11. The document information 111 may be image information, such as a PDF including sentences that are laid out, information including text data such as a text file or a Word file.

When the document information 111 is information other than text, the contract parsing unit 101 may perform OCR (Optical Character Recognition), for example, to convert the information into text, and then may split the obtained document information 111 into individual components, such as a title, preface, and article units, of a contract, and may store the resulting information as unit information 112 in the storage unit 11. Each article unit obtained through splitting is not limited to an article, and may be a paragraph or a sub-paragraph, or a group of a plurality of articles, paragraphs, or sub-paragraphs that has a certain meaning. Alternatively, each article unit may be a group of paragraphs or sub-paragraphs that has a certain meaning across different articles or paragraphs.

The information extraction unit 102 may extract from the unit information 112 information representing the content of the contract, and may store the information as extracted information 113 in the storage unit 11.

The normalization unit 103 may normalize the content of the extracted information 113 extracted by the information extraction unit 102 by unifying keywords, unifying the written form, supplementing information by referring to other information, estimating based on other information, or performing a name-based aggregation process, for example, and may store the resulting information as normalized extracted information 114 in the storage unit 11. One example of supplementing the information by referring to other information may be the expiration date of the contract is calculated from the effective date of the contract and the validity period. Examples of estimating based on other information includes estimating the corporate number from the corporate name, date, address, and the like. For performing the name-based aggregation process, for example, a keyword may be compared with keywords in a dictionary (i.e., a keyword list) using the Levenshtein distance or the similarity between the keywords, and a keyword close to that in the dictionary is selected as a normalized character string.

The display control unit 104 may display the document information 111, the unit information 112, the extracted information 113, and the normalized extracted information 114 in the storage unit 11 as well as the output result of each of the unit 100 to 103 on the display units of the terminal 2 and the terminal 3 in a controlled manner, using a predetermined method. The display method will be described in detail later.

The storage unit 11 may include a memory, such as a flash memory, and may be electrically connected to the control unit 10 including the processor and the like and to the communication unit 12 functioning as the communication interface. The storage unit 11 may store the document processing program 110, which may allow the control unit 10 to operate as each of the foregoing unit 100 to 104, the document information 111, the unit information 112, the extracted information 113, the normalized extracted information 114, and the like.

FIG. 3 is a schematic view illustrating an exemplary structure of the document information 111.

Document information 111a may be a contract, for example, and may include, as the unit information 112 obtained through splitting by the contract parsing unit 101, a title $112a_1$, a preface $112a_2$, and a plurality of articles (i.e., article units) $112a_3$, $112a_4$, $112a_5$ . . . of the contract. The article (i.e., the article unit) $112a_4$ may include a plurality of paragraphs (i.e., paragraph units) $112a_{41}$ and $112a_{42}$.

FIG. 4 is a schematic view illustrating an exemplary structure of the extracted information 113.

The extracted information 113 may be information extracted by the information extraction unit 102, and may include an extraction ID for identifying extracted information, extracted information extracted from the unit information 112, an extracted item that is an item to which the extracted information belongs, and the referenced position that is the positional information of the extracted information in the unit information 112.

FIG. 5 is a schematic view illustrating an exemplary structure of the normalized extracted information 114.

The normalized extracted information 114 may be information obtained by normalizing the extracted information 113 with the normalization unit 103, and may include an extraction ID, extracted information, and normalized extracted information obtained by normalizing the extracted information.

(Operation of Document Processing System)

Next, operations in a first embodiment, which include (1) a basic operation, (2) an operation of extracting information, and (3) an operation of displaying the extracted information, will be individually described. Hereinafter, an operation performed with the terminal 2 will be described, and if a similar operation is performed when the terminal 2 is replaced with the terminal 3, the description of such operation will be omitted.

(1) Basic Operation

First, a user may operate the terminal 2 to log into a service provided by the document processing server device 1. The terminal 2, upon receiving an input of information, such as a user ID and password, from the user, may send to the document processing server device 1 the information as well as an authentication request.

The document processing server device 1, upon receiving the information, such as the user ID and password, as well as the authentication request from the terminal 2, may refer to user information including user IDs and passwords registered in advance so as to authenticate the requester as the user.

Next, the user, upon logging into the service, may operate the terminal 2 to upload document information of a contract to the document processing server device 1. Then, the terminal 2 may upload the document information to the document processing server device 1.

(2) Operation of Extracting Information

Figure 10:
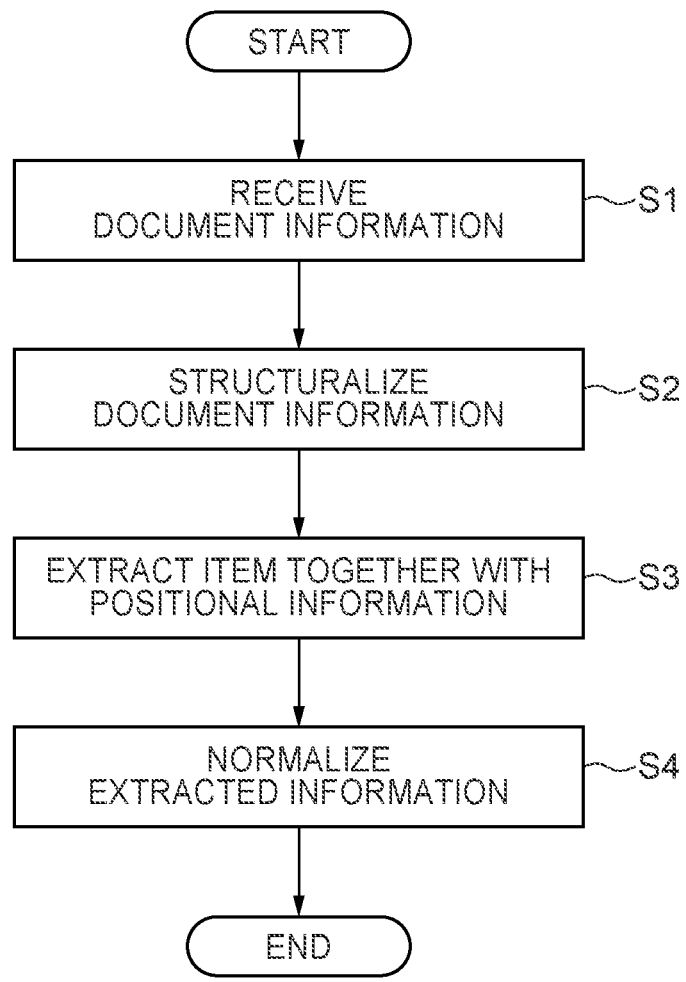
FIG. 10 is a flowchart illustrating an operation of extracting information with the document processing server device.

FIG. 10 is a flowchart illustrating an operation of extracting information with the document processing server device 1. FIG. 6 is a schematic view for illustrating an exemplary process of the operation of extracting information.

The contract receiving unit 100 of the document processing server device 1 may receive the document information 111 from the terminal 2 operated by the requester, and then may store the document information 111 in the storage unit 11 (S1).

Next, as illustrated in FIG. 3, the contract parsing unit 101 of the document processing server device 1 may structuralize the document information 111a by splitting it into individual components of the contract, thereby obtaining pieces of unit information 112a (S2). The document information 111a may be image information, such as a PDF (Portable Document Format) file, obtained by scanning the original hard copy of the contract, for example. The contract parsing unit 101 may first convert the document information 111a into text using an OCR (Optical Character Reader), for example. Then, the contract parsing unit 101 may split the obtained text information into the title $112a_1$, the preface $112a_2$, the article units $112a_3$ to $112a_7$ . . . , and the paragraph units $112a_{41}$, $112a_{42}$ . . . . The contract parsing unit 101 may further split the target document information 111a into sub-paragraphs, and may obtain the unit information 112a using the unit suitable for the structure of the document information 111a. The foregoing splitting may be performed using a technique, such as machine learning or regular expression. Such splitting may not be an essential operation, and the following operation may be performed without the splitting performed.

Next, the information extraction unit 102 may extract from the unit information 112a, which may be the structured document, information representing the content of the contract as well as the positional information (referenced position) thereof in the unit information 112a as pieces of extracted information $113a_1$ to $113a_5$ . . . (i.e., pieces of extracted information 113a), and then may store the extracted information in the storage unit 11 (S3). The foregoing extraction of the information may be performed using a technique named entity recognition based on a conditional random field, for example.

Next, the normalization unit 103 may normalize the pieces of extracted information 113a extracted by the information extraction unit 102 by performing a process, such as unifying keywords, supplementing the information by referring to other information, and performing a process in FIG. 7, and then may store the resulting information as pieces of normalized extracted information $114a_1$ to $114a_5$ . . . (i.e., pieces of normalized extracted information 114a) in the storage unit 11 (S4). The pieces of normalized extracted information 114a may be managed based on items, such as a title, a party concerned 1, a party concerned 2, the conclusion date, the effective date, the expiration date, and full text. The foregoing normalization of the information may be performed by comparing a keyword with that in a dictionary (i.e., a keyword list) using the Levenshtein distance or the similarity between the keywords.

FIG. 7 is a schematic view for illustrating an exemplary operation of the normalization unit 103.

Upon receiving the extracted information 113 including a date written in the Japanese calendar style like "Heisei 29, July 1" as the extracted item related to the date, the normalization unit 103 may normalize the date into "Jul. 1, 2017" written in the western calendar style as the normalized extracted information 114. Even when the extracted information 113 includes a date written in a different order in the western calendar style like "Jan. 7, 2017," "Jul. 1, 2017," or "Jul. 1, 2017," normalization may be performed similarly.

Upon receiving the extracted information 113 including a description of a period like "one year from Heisei 29, July 1" as the extracted item related to the date, the normalization unit 103 may normalize the description into a date corresponding to the expiration date like "Jun. 30, 2018" as the normalized extracted information 114.

Upon receiving the extracted information 113 including a specific description " . . . [T]he Agreement will be renewed under the same condition . . . . The same shall apply hereinafter." as the extracted item related to renewal, the normalization unit 103 may normalize the description into a simple description "automatically renewed" as the normalized extracted information 114.

Upon receiving the extracted information 113 including the position and name of a party concerned like "the Company (Lessee): LegalForce, Inc." as the extracted item related to a party concerned, the normalization unit 103 may normalize the description into the party concerned "LegalForce, Inc." as the normalized extracted information 114.

Upon receiving the extracted information 113 including a description position and the name of a party concerned described at the position like "the party described at the end of the Agreement [snip] LegalForce, Inc." as the extracted item related to a party concerned, the normalization unit 103 may normalize the description into the name of the party concerned "LegalForce, Inc." as the normalized extracted information 114.

Upon receiving the extracted information 113 including a pair of parties concerned like "[T]his Advisory Agreement (hereinafter, the "Agreement") is entered into between LegalForce, Inc. (hereinafter, the "Company") and the lawyer Nozomu TSUNODA (hereinafter, the "Lawyer") as follows." as the extracted item related to a party concerned, the normalization unit 103 may normalize the description into the pair of parties concerned "LegalForce, Inc./Nozomu TSUNODA" as the normalized extracted information 114.

Upon receiving the extracted information 113 including the effective date and the validity period like "[The] validity period of the Agreement is one year from the conclusion date of the Agreement . . . . Conclusion date: Jan. 1, 2020" as the extracted item related to the period, the normalization unit 103 may normalize the description into the effective date "Jan. 1, 2020" as the normalized extracted information 114.

The information extraction unit 102 and the normalization unit 103 may automatically perform extraction and normalization, respectively, as described above. However, as illustrated in FIG. 9, extraction and normalization may be performed in response to a user's operation regarding proper nouns, the date, and the period, for example.

Figure 9:
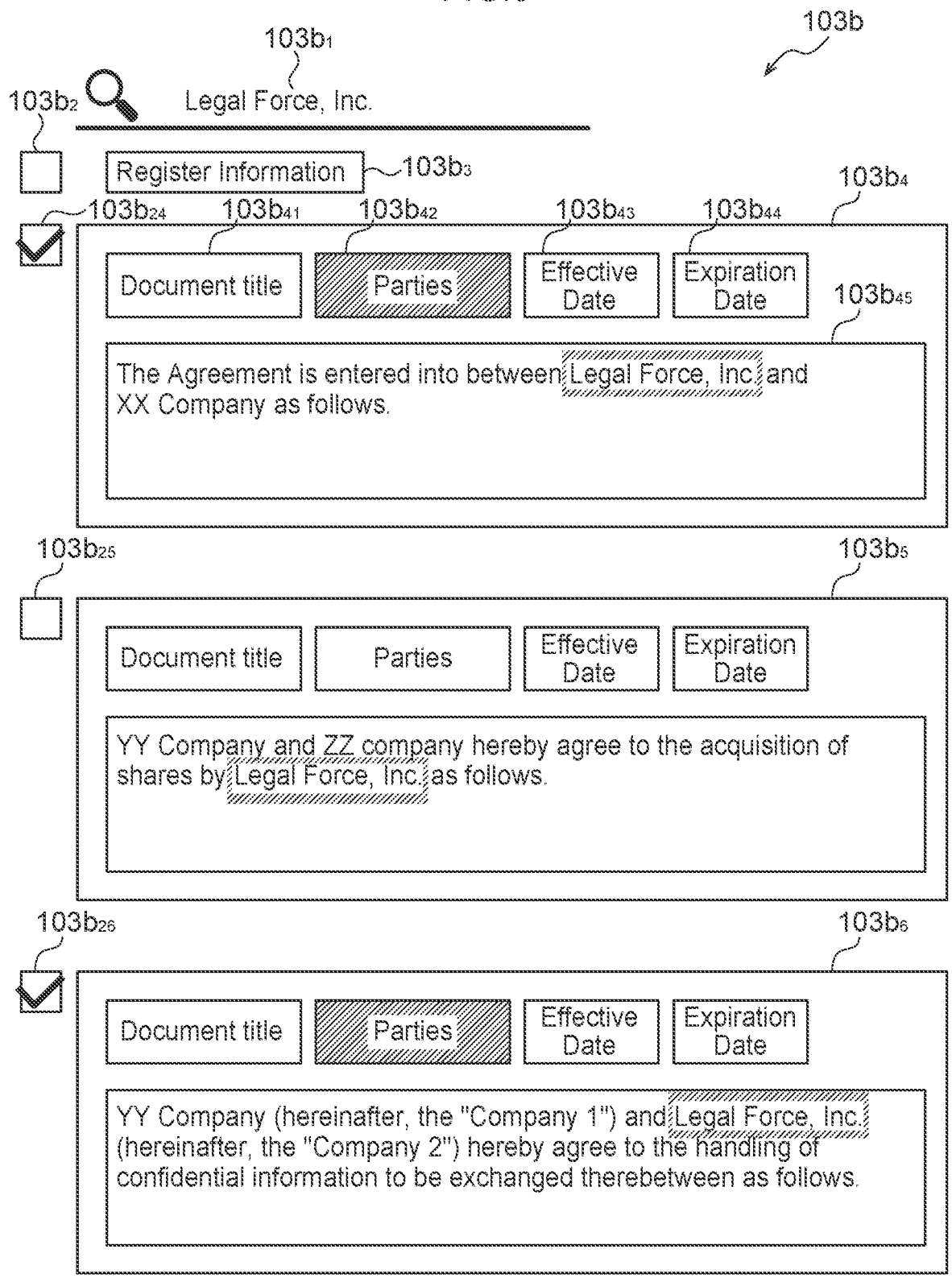
FIG. 9 is a schematic view illustrating an exemplary display of a screen displayed when extracted information is registered in response to an operation.

FIG. 9 is a schematic view illustrating an exemplary display of a screen displayed when extracted information is registered in response to an operation.

A screen $103b$ may include an input field $103b_1$ for receiving a desired search character string input by a user, a selection field $103b_2$ for registering all search results, selection fields $103b_{24}$, $103b_{25}$, $103b_{25}$ . . . for registering respective search results, a registration button $103b_3$ for registering the search results selected in the selection fields, and search results $103b_4$, $103b_5$, $103b_5$ . . . . Each of the search results $103b_4$, $103b_5$, $103b_5$ . . . may have a similar configuration. The configuration of the search result $103b_4$ will be described as a representative example. The search result $103b_4$ may include a button $103b_{41}$ for registering the search result as the title of a contract, a button $103b_{42}$ for registering the search result as the name of a party concerned, a button $103b_{43}$ for registering the search result as the effective date, a button $103b_{44}$ for registering the search result as the expiration date, and a display field $103b_{45}$ for displaying the character string of the search result.

The user may perform a registration operation by inputting a desired search character string into the input field $103b_1$ on the screen $103b$, and checking the obtained search results $103b_4$, $103b_5$, $103b_5$ . . . , and then selecting the selection field $103b_2$ or selecting one or more of the selection fields $103b_{24}$, $103b_{25}$, $103b_{25}$ . . . regarding the desired search results to be registered, and also appropriately selecting one or more of the buttons $103b_{41}$ to $103b_{44}$, and further pressing the registration button $103b_3$.

The information extraction unit 102 and the normalization unit 103 may respectively register the selected character string as the extracted information 113 and the normalized extracted information 114.

(3) Operation of Displaying Extracted Information

Next, the user may operate the terminal 2 to request the document processing server device 1 to allow the user to refer to the content of a desired contract, and then may select the contract. The terminal 2 may request the document processing server device 1 to allow the user to select a contract and refer to the content of the selected contract.

The display control unit 104 of the document processing server device 1 may perform, upon receiving the request to allow the user to select a contract and refer to the content of the selected contract, a process of displaying the normalized extracted information $114a$ together with the document information $111a$ and the unit information $112a$.

FIG. 8 is a schematic view illustrating an exemplary display of the display control unit 104.

A screen $104a$ may be a screen displayed by the display control unit 104, and may include a document information display field $104a_1$ for displaying the document information $111a$, which is the original text of a contract, a structured document display field $104a_2$ for displaying the unit information $112a$, which is the structured document, and a normalized extracted information display field $104a_3$ for displaying the normalized extracted information $114a$, which is the normalized extracted information, for each item.

Next, the user may operate the terminal 2 to select a desired item in the normalized extracted information display field $104a_3$. The terminal 2 may request the document processing server device 1 to allow the user to select an item of the normalized extracted information $114a$.

Figure 11:
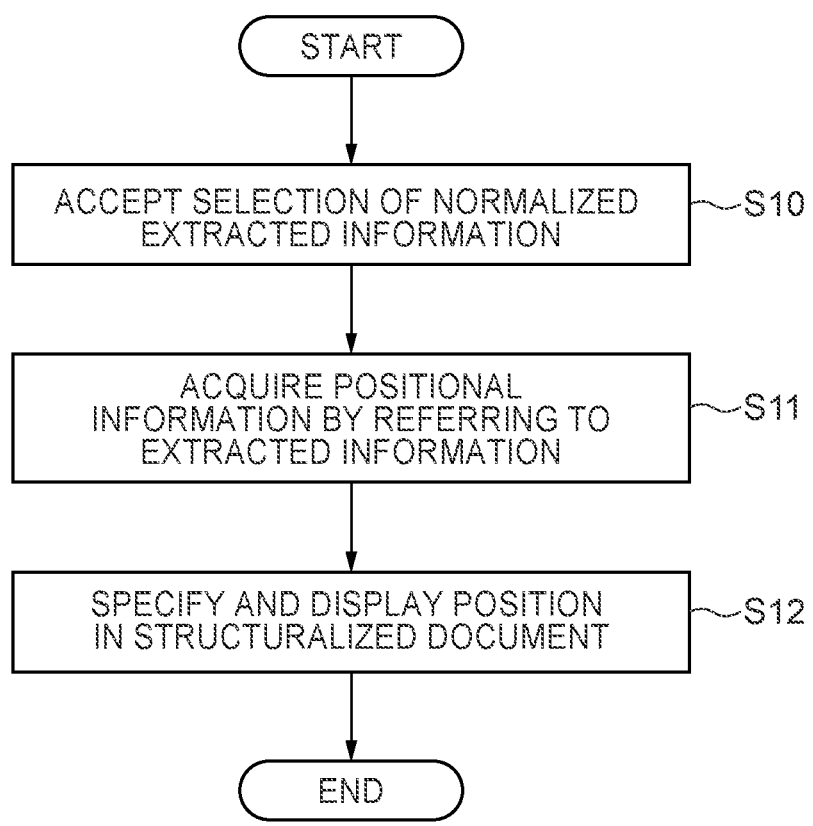
FIG. 11 is a flowchart for illustrating a display process operation.

FIG. 11 is an example of a flowchart for illustrating the display process operation.

When the display control unit 104 receives selection of an item of the normalized extracted information $114a$ (S10), the display control unit 104 may select normalized extracted information $104a_{32}$ as the selected item, and may acquire the positional information of the extracted information $113a$ by referring to the referenced position thereof (S11), and then may specify and display a character string $104b_2$ at the position in the unit information $104a_{22}$ in the structured document display field $104a_2$ that is the structured document (S12).

The user may check the character string $104b_2$ at the position, and may check the position in the unit information $112a$, the position in the document information $111a$, and the like.

Advantageous Effects of Embodiment

According to the foregoing embodiment, the document information 111 may be converted into text and may be structured, and from the resulting structured unit information 112, a character string indicating the content of a document may be extracted to obtain the extracted information 113, and then, each character string of the extracted information 113 may be normalized to obtain the normalized extracted information 114, and also, the content of the normalized extracted information 114 may be displayed together with its position in the unit information 112. Thus, even when the extracted character string has spelling inconsistencies, the relevant portions can be managed in a unified manner.

Further, since the document information 111, the unit information 112, and the normalized extracted information 114 may be displayed in a controlled manner and in association with one another, it is possible to check the positional information of the extracted character string in the unit information 112, and also check if the extracted character string is surely described in the document information 111 that is the original text.

Other Embodiments

The present invention is not limited to the foregoing embodiment, and can be modified in various ways within the scope of the present invention.

For example, the document information 111 may be a legal document or a document in a field other than the legal field, such as an instruction manual, as long as information can be extracted from such document. The present invention may be similarly applicable to such document. In addition, the individual components may be words, characters, symbols, paragraphs, or sentences. Further, the language of the document information 111 may be Japanese, English or any other languages that can construct a sentence from which information can be extracted.

In the foregoing embodiment, the function of each of the unit 100 to 104 of the control unit 10 is implemented by a program, but some or all of the unit may be implemented by hardware, such as an ASIC. Alternatively, the program used in the foregoing embodiment may be provided by being stored in a recording medium, such as a CD-ROM. Further, the order of the steps described in the foregoing embodiment may be changed, or one or more of the steps may be removed, or further, (an)other step(s) may be added.

[Notes]

The disclosed embodiment further discloses the following notes.

(Note 1)

A document processing program for causing a computer to function as extraction means for extracting from document information a character string indicating a content of a document together with positional information of the character string in the document information; normalization means for normalizing the character string extracted by the extraction means to obtain normalized extracted information; and display control means for displaying a content of the normalized extracted information while indicating a position of the normalized extracted information in the document information based on the positional information.

(Note 2)

The document processing program according to Note 1 above, for further causing a computer to function as splitting means for splitting the document information based on a predetermined unit to obtain unit information, in which the extraction means extracts a character string indicating a content of the document together with positional information of the character string in the unit information, and the display control means displays a content of the normalized extracted information while indicating a position of the normalized extracted information in the unit information based on the positional information of the character string in the unit information.

(Note 3)

The document processing program according to Note 1 or 2, in which the extraction means registers as extracted information a character string specified in the document information.

(Note 4)

The document processing program according to any one of Note 1 to Note 3 above, in which the display control means displays the normalized extracted information, the unit information, and the document information in association with one another.

(Note 5)

The document processing program according to any one of Notes 1 to 4 above, in which the computer is connected to one or more terminals via a network in a communicable manner.

(Note 6)

The document processing program according to any one of Notes 1 to 5 above, in which the computer is connected to one or more terminals via a wireless communication network.

(Note 7)

An information processing device including extraction means for extracting from document information a character string indicating a content of a document together with positional information of the character string in the document information; normalization means for normalizing the character string extracted by the extraction means to obtain normalized extracted information; and display control means for displaying a content of the normalized extracted information while indicating a position of the normalized extracted information in the document information based on the positional information.

(Note 8)

An information processing device including a memory configured to store document information in addition to a predetermined instruction; and a processor configured to, based on the instruction stored in the memory, execute a process for performing the following: extracting from the document information a character string indicating a content of a document together with positional information of the character string in the document information, normalizing the extracted character string to obtain normalized extracted information, and displaying a content of the normalized extracted information while indicating a position of the normalized extracted information in the document information based on the positional information.

(Note 9)

A document processing method including an extraction step of extracting from document information a character string indicating a content of a document together with positional information of the character string in the document information; a normalization step of normalizing the extracted character string to obtain normalized extracted information; and a display control step of displaying a content of the normalized extracted information while indicating a position of the normalized extracted information in the document information based on the positional information.

What is claimed is:

1. A computer-implemented method for document processing, the method comprising:
    obtaining one or more character strings indicating content extracted from document information;
    obtaining respective positional information, in the document information, corresponding to each of the one or more character strings;
    obtaining one or more pieces of normalized extracted information by normalizing the one or more character strings in the document information;
    displaying, on a terminal, one or more items corresponding to the one or more pieces of normalized extracted information;
    receiving a selection of at least one of the one or more items displayed on the terminal; and
    for each selected item, displaying, on the terminal, the document information and the positional information of the character string corresponding to each selected item.

2. The computer-implemented document processing-method according to claim 1, wherein:
    the one or more pieces of normalized extracted information include one or more of a title, a party concerned, a conclusion date, an effective date, and an expiration date.

3. The computer-implemented method according to claim 1, further comprising registering, as extracted information, one or more of the character strings specified in the document information.

4. The computer-implemented method according to claim 1, further comprising communicating with the terminal via a network.

5. The computer-implemented method according to claim 1, further comprising communicating with the terminal via a wireless communication network.

6. The computer-implemented method according to claim 1, further comprising:
splitting the document information based on a predetermined unit to obtain unit information.

7. The computer-implemented method according to claim 6, further comprising:
splitting the document information based on at least one of an article, a paragraph or a sub-paragraph, or a group of a plurality of articles of the document information.

8. The computer-implemented method according to claim 6, further comprising:
generating information for displaying the normalized extracted information, the unit information, and the document information in association with one another.

9. The computer-implemented method according to claim 1, wherein:
the document information is a contract.

10. An information processing device comprising:
one or more memories configured to store document information in addition to a predetermined instruction; and
one or more processors configured to:
receive the document information;
obtain one or more character strings indicating content extracted from the document information;
obtain respective positional information, in the document information, corresponding to each of the one or more character strings;
obtain one or more pieces of normalized extracted information by normalizing the one or more character strings in the document information;
display, on a terminal, one or more items corresponding to the one or more pieces of normalized extracted information;
receive a selection of at least one of the one or more items displayed on the terminal; and
for each selected item, display, on the terminal, the document information and the positional information of the character string corresponding to each selected item.

11. The information processing device according to claim 10, wherein the one or more processors are further configured to register, as extracted information, one or more of the character strings specified in the document information.

12. The information processing device according to claim 10, wherein the one or more processors are further configured to split the document information based on one or more a predetermined units to obtain unit information.

13. The information processing device according to claim 10, wherein the one or more processors are further configured to split the document information based on at least one of an article, a paragraph or a sub-paragraph, and a group of a plurality of articles of the document information.

14. The information processing device according to claim 10, wherein the one or more processors are further configured to generate information for displaying the normalized extracted information, the unit information, and the document information in association with one another.

15. The information processing device according to claim 10, wherein the document information comprises a contract.

16. The information processing device according to claim 10, wherein the one or more pieces of normalized extracted information include one or more of a title, a party concerned, a conclusion date, an effective date, and an expiration date.

17. An information processing system comprising:
one or more memories configured to store document information in addition to a predetermined instruction; and
one or more processors configured to:
receive the document information;
obtain one or more character strings indicating content extracted from the document information;
obtain respective positional information, in the document information, corresponding to each of the one or more character strings;
obtain one or more pieces of normalized extracted information by normalizing the one or more character strings in the document information;
display, on a terminal, one or more items corresponding to the one or more pieces of normalized extracted information;
receive a selection of at least one of the one or more items displayed on the terminal; and
for each selected item, display, on the terminal, the document information and the positional information of the character string corresponding to each selected item.

18. The information processing system according to claim 17, wherein the one or more pieces of normalized extracted information include one or more of a title, a party concerned, a conclusion date, an effective date, and an expiration date.

* * * * *